United States Patent [19]

Jarzenbeck, Sr.

[11] 4,246,888

[45] Jan. 27, 1981

[54] SOLAR HEAT COLLECTING APPARATUS

[76] Inventor: Jerome F. Jarzenbeck, Sr., #24 W. R.R. #1, South Sioux City, Nebr. 68776

[21] Appl. No.: 38,436

[22] Filed: May 14, 1979

[51] Int. Cl.³ .............................................. F24J 3/02
[52] U.S. Cl. .................... 126/429; 126/430; 126/448; 126/449
[58] Field of Search ............... 126/429, 446, 447, 448, 126/436, 430, 417, 449, 445

[56] References Cited

U.S. PATENT DOCUMENTS

| | | | |
|---|---|---|---|
| 3,815,574 | 6/1974 | Gaydos | 126/436 |
| 3,902,474 | 9/1975 | Pyle | 126/449 |
| 3,952,725 | 4/1976 | Edmondson | 126/447 |
| 4,059,226 | 11/1977 | Atkinson | 126/427 |
| 4,068,652 | 1/1978 | Worthington | 126/429 |
| 4,083,360 | 4/1978 | Courvoisier et al. | 126/447 |
| 4,088,266 | 5/1978 | Keyes | 126/449 |
| 4,099,513 | 7/1978 | Skrivseth | 126/449 |
| 4,119,083 | 10/1978 | Heyen | 126/449 |
| 4,129,117 | 12/1978 | Harvey | 126/448 |
| 4,151,829 | 5/1979 | Wilson | 126/449 |

*Primary Examiner*—James C. Yeung
*Assistant Examiner*—Daniel O'Connor
*Attorney, Agent, or Firm*—Henderson & Sturm

[57] ABSTRACT

A combined solar heating apparatus for heating air or water or both air and water comprising a corrugated collector plate with S-shaped tubing traversing the enclosure beneath the plate. The rear of the corrugated plate is enclosed so as to allow filling of the air space with an aggregate material to provide increasing temperature and heat storage characteristics. A continuous tubing with a liquid source is formed with a plurality of S-shaped loops passing through the rear of the collector plate and through the aggregate. A rear wall member is attached to the back of the corrugated collector to form an air enclosure. A transparent plate sealingly encloses the top of the collector, providing an air space between the collector plate and the transparent cover.

1 Claim, 8 Drawing Figures

SOLAR HEAT COLLECTING APPARATUS

BACKGROUND OF THE INVENTION

The use of solar energy to provide heating is well known in the art. The conventional collector is comprised of a collector plate to absorb radiant energy and transfer this energy in the form of heat through the collector plate to a heat storage unit for subsequent usage. Solar heaters have been used in a variety of applications to produce heated air, water and electricity. One of the major problems associated with these heat collectors is the efficiency of the collector. Another problem is the relative cost of these collectors to the consumer. Consequently, there is a need for a solar heat collecting apparatus for solving these problems.

SUMMARY OF THE INVENTION

The present invention relates to a solar heat collecting apparatus having an insulated frame including a back, sides, a top and a bottom. The back has slots therein for providing an air inlet and outlet. Collecting structure, including a front plate and a back plate are disposed within the frame. An aggregate material such as gravel is disposed between the front and back collector plates. A conduit constructed of a highly heat conductive material is located between the front and back plates of the collecting structure for providing a path for fluid flow therethrough. A cover is sealingly attached to a front portion of the frame for allowing rays of sunlight to pass therethrough. Additionally, an air passageway is provided between the front plate and the cover in communication with the air inlet and air outlet.

An object of the present invention is to provide a combination air and water solar heater which is significantly more efficient than previously disclosed collectors.

Another object of the invention is to improve the heat storage capacity of a storage solar collector while reducing its size.

A further object of the invention is to provide an inexpensive portable solar collection unit.

Still another object is to provide a solar collection apparatus which will heat air or water or both air and water.

A still further object of the invention is to provide a heat storage method wholly within the collector to increase temperature and heat retention.

Other objects, advantages and novel features of the present invention will become apparent from the following detailed description of the invention when considered in conjunction with the accompanying drawings.

DESCRIPTION OF THE PREFERRED EMBODIMENT

Figure 1:
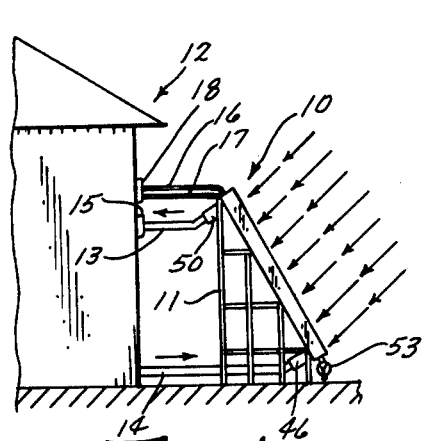
FIG. 1 shows a side-elevational view of the present invention shown to attached to building.

Referring now to the drawings where in like reference numerals designate identical or corresponding parts throughout the several views, FIG. 1 shows a solar collector 10 mounted on a stand 11. The solar collector 10 is attached to a building 12 by means of an inlet air conduit 13 and an outlet air conduit 14. A fan 15, shown schematically in FIG. 1 causes circulation of air through the inlet 13, solar collector 10 and air inlet 14. Additionally, a water inlet pipe 16 and a water outlet pipe 17 are connected from the solar collector 10 to the building 12. A pump 18 is connected in either line 16 or 17 for providing circulation through the solar collector and water lines 16 and 17.

Figure 2:
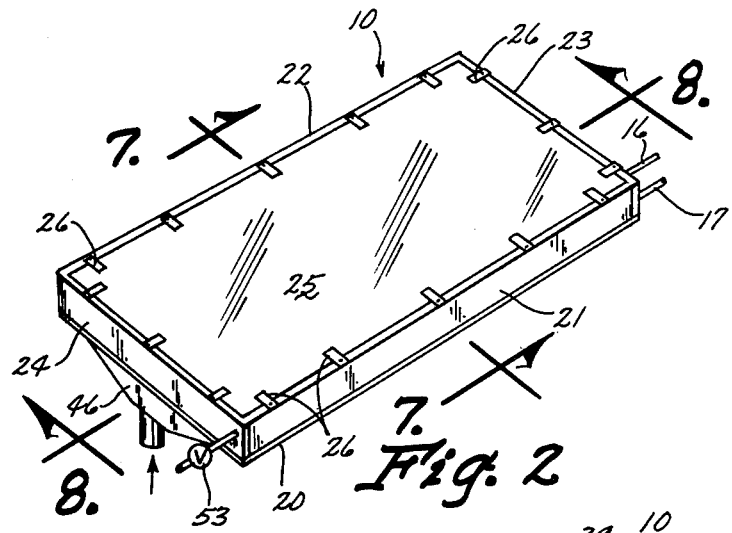
FIG. 2 is a perspective view of the solar collector of the present invention.

Referring now with more particularity to the solar collector 10 shown in FIG. 2, it is noted that the collector 10 includes a frame having a back 20, sides 21 and 22, a top 23 and a bottom 24. In addition, a thermopane (double-pane) front cover 25 is sealingly secured to the front of the collector 10 by means of a plurality of clamps 26. It is to be understood that many other ways of securing the cover 25 to the frame can be used without departing from the spirit and scope of this invention.

Figure 7:
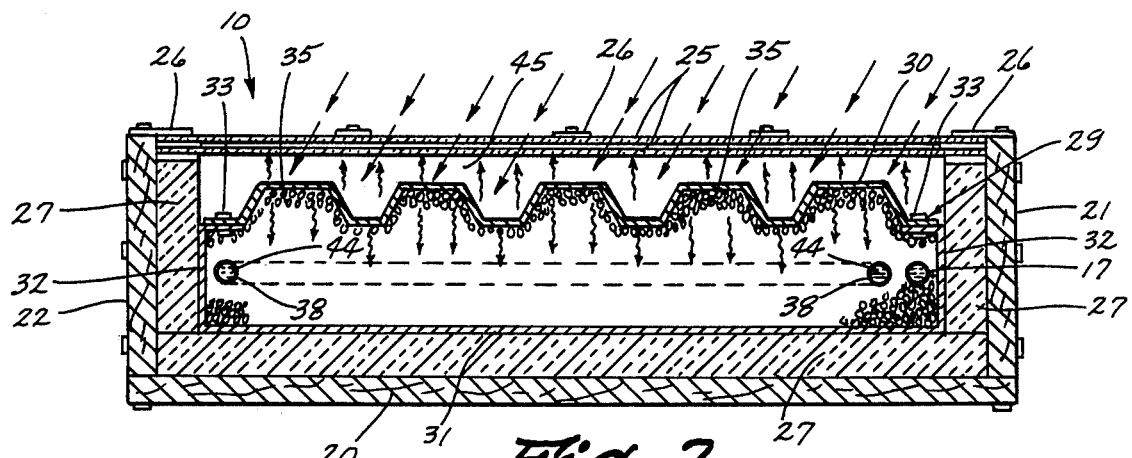
FIG. 7 is a cross-sectional view taken along line 7—7 of FIG. 2.

Referring to FIG. 7, for example, it is noted that a two-inch layer of insulation 27 is disposed entirely around the inside of the frame, with the exception of an opening 28 therein which will be referred to below. A solar collecting structure 29 is disposed within the frame and within the insulation 27, and additionally below the thermopane covering 25, as can clearly be seen in FIG. 7. This collecting structure 29 includes a front plate 30 which is corrugated in structure and a flat back plate 31 which plates are connected together by sides 32 and a plurality of fasteners 33 connected through the edges of the corrugated front plate 30 and a flange 34 connected to the sides 32. The front plate 30 is preferably constructed of steel which has a galvanized coating on all sides thereof. An epoxy primer is then coated over the galvanized layer. A dark bronze coat of fluorcarbon based enamel containing polyvinylidene fluoride which can be purchased under the trademark KYNOR is then placed on the top side of the corrugated front plate 30. Then a coat of chalkboard slating is placed on the top side over the enamel; and, a coat of 3M brand neotel-black velvet 101-C10 is painted on top of the chalkboard slating. It has been determined that this combination is very excellent for the purpose of absorbing sunlight but yet retarding the emmission of heat back out thereof.

Figure 8:
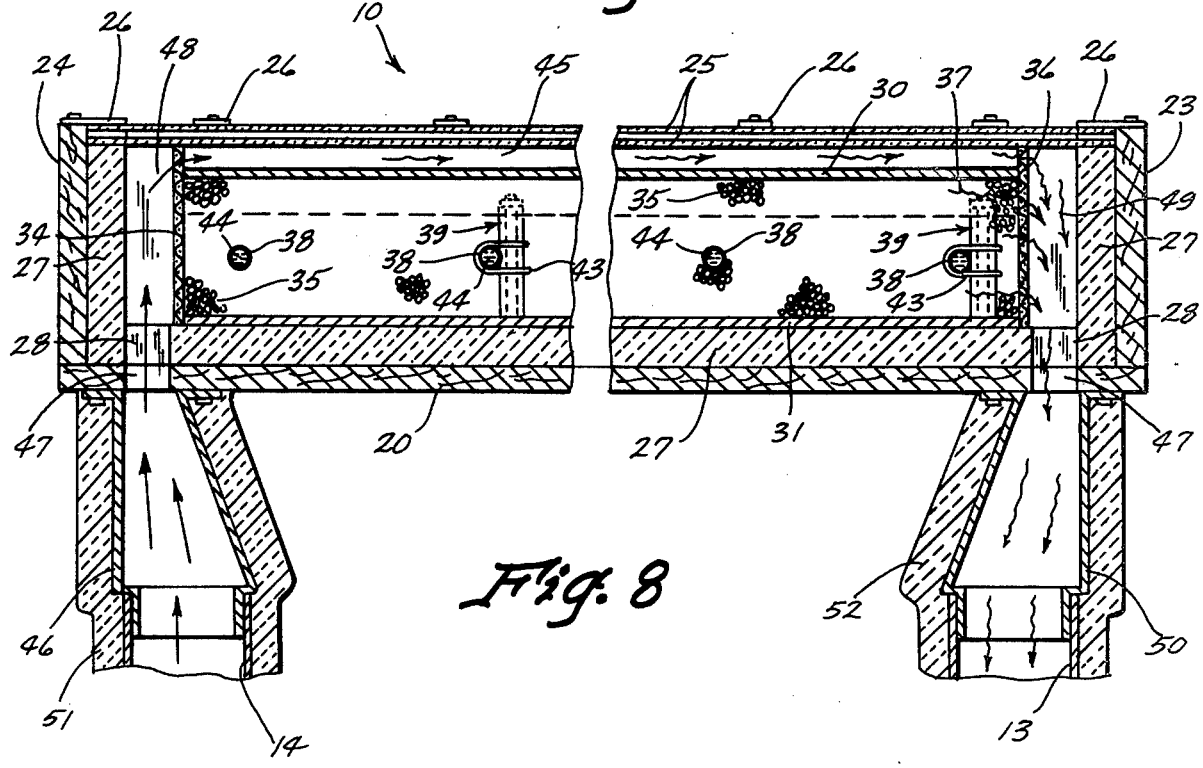
FIG. 8 is a cross-sectional view taken along 8—8 of FIG. 2.

A wire screen mesh 34 is attached across the bottom ends of the collector structure 29 as can best be seen in FIG. 8. Gravel 35 is then placed within the collector structure 29, although the gravel can be placed in at any other time which is convenient. Once the gravel is in place then a top metal screen structure 36 is placed over the top end of the collector structure 29 as can best be seen in FIG. 8. These screens 34 and 36 hold the gravel between the front and rear plates 30 and 31 respectively but allow heat to rise and pass through the gravel and out through the top screen 36 as shown by the arrows 37 in FIG. 8.

Figure 4:
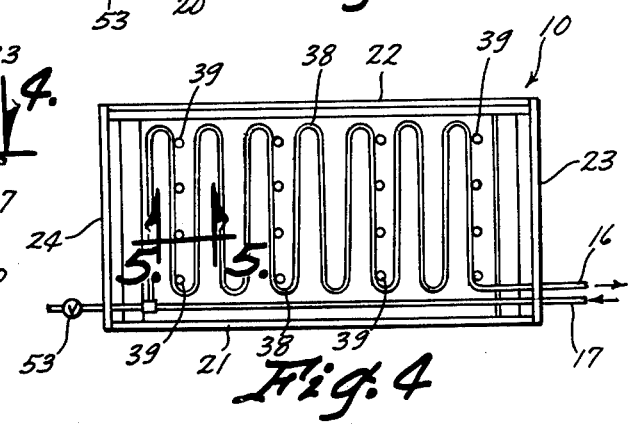
FIG. 4 is a cross-sectional view taken along line 4—4 of FIG. 3.
Figure 6:
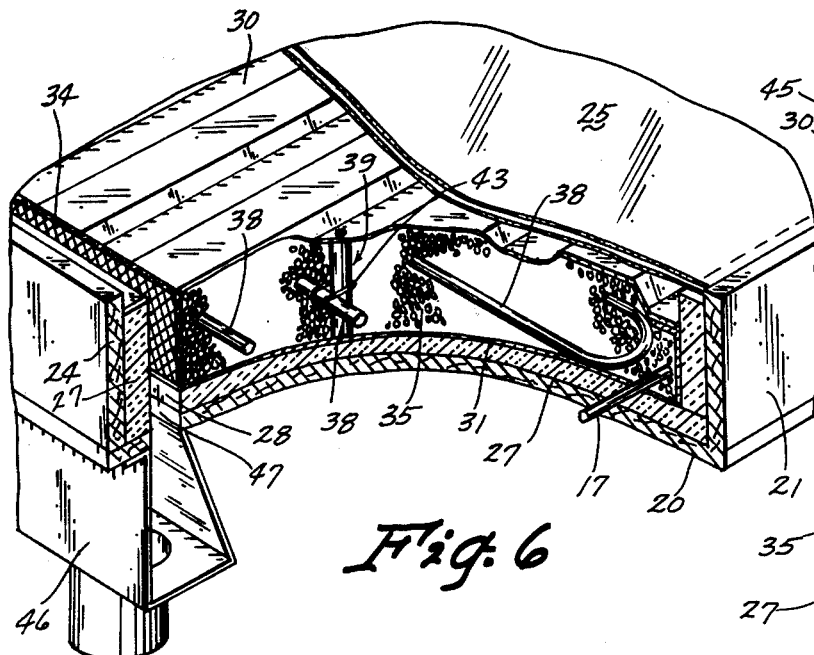
FIG. 6 is an enlarged partial cross-sectional perspective and broken-away view of the solar collector showing various parts thereof.
Figure 5:
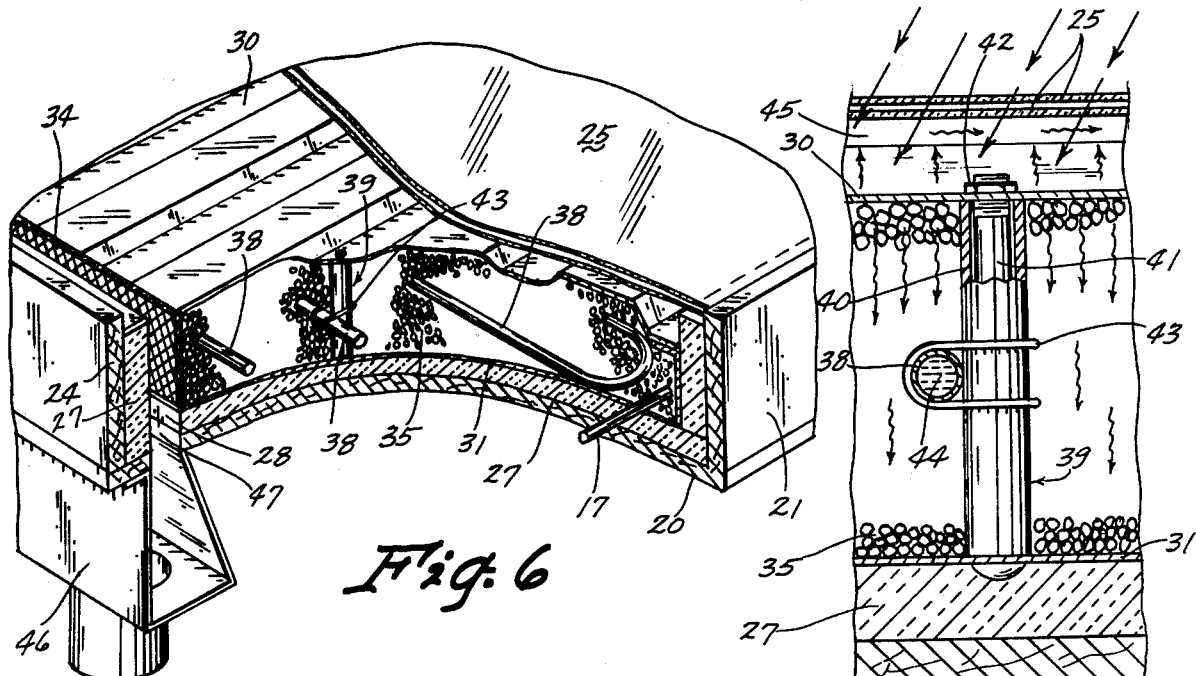
FIG. 5 is an enlarged partial cross-sectional view taken along line 5—5 of FIG. 4.

Referring now to FIGS. 4, 5 and 6 it is noted that copper tubing 38 formed in partial loops or S-shaped loops is provided within the gravel 35. Spacer structures 39 are provided for holding the front plate 30 and the back plate 31 in a particular spaced relationship while further providing a means for supporting and holding the copper tubing 38 in a predetermined relationship with respect to the gravel and with respect to the front and back plates 30 and 31 respectively. The spacer members 39 include a tube 40, a bolt 41 passing therethrough and a threaded nut member 42 threadedly secured to one end of the bolt 41 as can best be seen in FIG. 5. The copper tubing 38 is secured to the spacer members 39 by means of a wire 43, but it is to be understood that other securing mechanisms can be used. It is important to note, however, that if more heat is desired to be applied to the water 44 within the copper tube 38, then the copper pipe 38 would be placed closer to the front plate 30, while, conversely, if it is desired to provide more heat to the air within the passageway 45 than to the fluid 44 within the tubing 38, then the tube 38 would be placed closer to the back plate 31 then to the front plate 30. This placement can be used to adjust the relative amount of heat to be applied to the water 44 or to the air in the space 45, as will be clearly understood to those skilled in this art.

Figure 3:
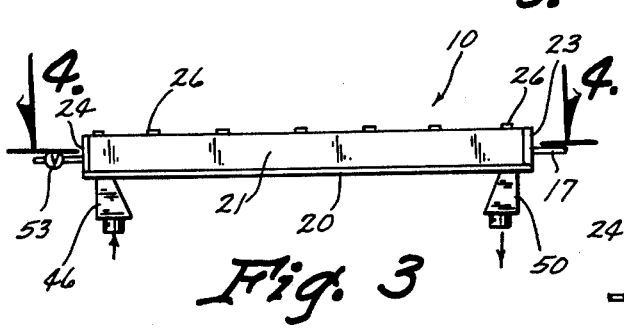
FIG. 3 is a side-elevational view of the solar collector shown in FIG. 2.

Referring now more particularly to the way that the air is heated utilizing the solar collector 10 it is noted with attention directed to FIGS. 3, 6 and 8 that an inlet connector 46 is connected to the bottom of the solar collector 10 and connects the line 14 from the building 12. The air passes into the connector 46 and through an elongated opening 47 disposed in the back of the frame 20. The air then passes through an opening 28 in the insulation and between the screen 34 and the insulation 27 adjacent the bottom 24 of the frame.

Referring now to FIG. 8, it is noted that arrow 48 shows how the air passes from the underside of the screen into the space 45 between the front plate 30 and the thermopane cover 25. This air, as it passes through the opening 45, is heated by the heat which is absorbed into the front plate 30 and which tends to be stored within the gravel 35; and, this air eventually passes through a top opening 49, through the passageway 28 on the right side of FIG. 8, a top passageway 47 through the back 20 of the frame and then out through a top connector member 50 to the pipe 13 which leads the heated air back to the building 12. It is noted that insulation 51 and 52 is provided around the connectors 46 and 50 as well as around the pipes 13 and 14 to prevent the transfer of heat to the atmosphere. Likewise, insulation would actually be provided around the pipe 16 and 17 which are shown in FIG. 1 and which lead to the building 12 to be heated.

In operation, the solar collector would be shown as indicated in FIG. 1. When not in use, a drainage valve 53 can be utilized to drain all of the water out of the pipe 38 so that it will not freeze. When the sun is shining, the rays of sunlight will pass through the glass thermopane cover 25 and strike the front plate 30. This solar heat will be transferred to the gravel 35, to the copper pipe 38 and ultimately to the water 44 therein. When the pump 18 is functioning, this water will be transferred to the inside of the building 12 to be used for any uses for which hot water is needed. At the same time, heated air can be circulated through the collector 10, as described above, by merely allowing the heated air to rise or preferably by using a circulating fan 15 for forcing the air through the solar collector 10.

It is important to note that the present invention can be used to heat the air only by not circulating the water 44 through the pipe 38, for example by not running the pump 18. Also, the present invention can be used to heat primarily, if not only, the water 44 by not using the forced air fan 15 and utilizing only the pump 18. Thirdly, the present invention can be used for heating both the water 44 and the air as described in detail in the paragraph above and by utilizing both the forced air fan 15 and the pump 18.

Obviously many modifications and variations of the present invention are possible in light of the above teachings. It is, therefore, to be understood that, within the scope of the appended claims, the invention may be practiced otherwise then as specifically described.

I claim:

1. A solar heat collecting apparatus comprising:
an insulating frame means including a back, sides, a top and a bottom, said back having slot means therein for providing an air inlet and outlet;
collecting means including a front plate and a back plate disposed within said frame means;
an aggregate material disposed between the front and back collector plates;
conduit means constructed of a highly heat conductive material, said conduit means being disposed between the front and back plates of said collecting means for providing a path for fluid flow therethrough;
cover means sealingly attached to a front portion of said frame means for allowing rays of sunlight to pass therethrough;
air passageway means being formed between said front plate and said cover means, said air passageway means being in communication with said air inlet and air outlet;
wherein a screen is disposed across each of the ends of said front and back collector plates and attached thereto wherein said aggregate material is held between said front and back collector plates and heated air is allowed to move through said screen;
wherein said aggregate material completely fills said collecting means;
wherein said aggregate material is gravel;
wherein said front and back collector plates are constructed of galvanized steel;
wherein said front plate is corrugated and said back plate is flat;
wherein said front plate includes an epoxy primer on top of the galvanized steel, a coat of dark bronze colored fluorocarbon based enamel containing polyvinylidene fluoride on top of the epoxy primer, a coat of chalkboard slating on top of the fluorocarbon based enamel and a coat of 3M brand nextel-black velvet 101 - C10 on top of the chalkboard slating;
wherein said conduit means is formed into a series of partial loops;
wherein one end of said frame means is disposed at a higher elevation than the other end thereof whereby air heated in said air passageway means rises into said air outlet including valve means attached to a bottom portion of said conduit means for draining fluid from said conduit means, including pump means attached to said conduit means for circulating fluid through said conduit means, including means for connecting said air inlet to an enclosure to be heated and means for connecting said air outlet to said enclosure, including fan means disposed in one of said inlet or outlet connecting means for circulating air through said air passageway means and said enclosure, including a plurality of spacer means disposed within said aggregate and between said front plate and said back plate for holding said front and back plates a predetermined distance apart;

wherein each of said spacer means comprises a tube, bolt means extending through said tube and through the front plate and back plate and having nut means threadably disposed on one end of said bolt means, including means for attaching said conduit means to said spacer means for fixing the position of said conduit means with respect to said front and back plates of said collecting means.

* * * * *